United States Patent
Deguchi et al.

(10) Patent No.: US 10,056,859 B2
(45) Date of Patent: Aug. 21, 2018

(54) CONTROL DEVICE FOR SWITCHED RELUCTANCE MOTOR

(71) Applicant: TOYOTA JIDOSHA KABUSHIKI KAISHA, Toyota-shi, Aichi-ken (JP)

(72) Inventors: Junichi Deguchi, Susono (JP); Takahiro Shiina, Numazu (JP); Kensuke Yoshizue, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/800,785

(22) Filed: Nov. 1, 2017

(65) Prior Publication Data

US 2018/0152130 A1 May 31, 2018

(30) Foreign Application Priority Data

Nov. 25, 2016 (JP) .................................. 2016-229436

(51) Int. Cl.
*H02P 6/00* (2016.01)
*H02P 25/098* (2016.01)
(Continued)

(52) U.S. Cl.
CPC .............. *H02P 25/098* (2016.02); *H02P 6/10* (2013.01); *H02P 6/181* (2013.01);
(Continued)

(58) Field of Classification Search
CPC ...... H02P 25/098; H02P 25/0805; H02P 6/10; H02P 6/181; H02P 27/06; H02P 6/28; H02P 25/0925; H02P 6/16

USPC ........................................................ 318/701
See application file for complete search history.

(56) References Cited

U.S. PATENT DOCUMENTS 5,111,095 A * 5/1992 Hendershot .......... H02K 19/103
174/DIG. 19
5,977,740 A * 11/1999 McCann ................. H02P 3/065
318/400.01

(Continued)

OTHER PUBLICATIONS

U.S. Appl. No. 15/673,517, filed Aug. 10, 2017.
(Continued)

*Primary Examiner* — Eduardo Colon Santana
*Assistant Examiner* — Gabriel Agared
(74) *Attorney, Agent, or Firm* — Hunton Andrews Kurth LLP

(57) ABSTRACT

A control device for a switched reluctance motor includes an inverter having a switching circuit that switches a magnetic pole to provide a first winding pattern or a second winding pattern. With respect to a boundary dividing a driving range of the switched reluctance motor into two ranges, the control device performs switching to the first winding pattern when the torque and the rotational speed are located in the first range on the low load side, performs switching to the second winding pattern when the torque and the rotational speed are located in the second range, allows switching of the magnetic pole in a case where a current of the phase whose magnetic pole is to be switched among the three-phase coils is 0, and prohibits switching of the magnetic pole in a case where the current of the phase whose magnetic pole is to be switched is not 0.

5 Claims, 14 Drawing Sheets

(51) Int. Cl.
*H02P 25/08* (2016.01)
*H02P 6/10* (2006.01)
*H02P 6/18* (2016.01)
*H02P 27/06* (2006.01)
*H02P 6/28* (2016.01)
*H02P 25/092* (2016.01)
*H02P 6/16* (2016.01)

(52) U.S. Cl.
CPC .......... *H02P 25/0805* (2016.02); *H02P 27/06* (2013.01); *H02P 6/16* (2013.01); *H02P 6/28* (2016.02); *H02P 25/0925* (2016.02)

(56) References Cited

U.S. PATENT DOCUMENTS

| | | | | |
|---|---|---|---|---|
| 6,150,791 | A * | 11/2000 | Fulton | H02P 25/098 318/376 |
| 2002/0125782 | A1 * | 9/2002 | Peachee | H02K 1/148 310/166 |
| 2012/0169267 | A1 * | 7/2012 | Nashiki | H02K 19/103 318/701 |
| 2013/0342039 | A1 * | 12/2013 | Umemori | H02K 29/03 310/49.43 |
| 2013/0342040 | A1 * | 12/2013 | Umemori | H02K 37/04 310/49.43 |
| 2016/0285402 | A1 * | 9/2016 | Barrass | H02P 25/0925 |
| 2018/0062554 | A1 * | 3/2018 | Deguchi | H02P 25/092 |

OTHER PUBLICATIONS

Takeno, et al., "Improvement of torque characteristic of a 50kW SRM for HEV with a consideration of magnetic saturation of stator yoke", The Japan Society of Applied Electromagnetics and Mechanics, vol. 19, No. 2 (Jun. 2011), 6 pages.

* cited by examiner

CONTROL DEVICE FOR SWITCHED RELUCTANCE MOTOR

CROSS-REFERENCE TO RELATED APPLICATIONS

This application claims priority to Japanese Patent Application No. 2016-229436 filed on Nov. 25, 2016, which is incorporated herein by reference in its entirety.

BACKGROUND

1. Technical Field

The disclosure relates to a control device for a switched reluctance motor.

2. Description of Related Art

There is known a switched reluctance motor including a stator having a plurality of salient poles, a rotor having a plurality of salient poles that are adapted to face the salient poles of the stator, and a plurality of coils respectively wound around the salient poles of the stator. The switched reluctance motor rotates the rotor by a magnetic attraction force generated between the salient poles of the stator and the rotor.

In Motoki Takeno and four others, "Improvement of torque characteristic of a 50 kW SRM for HEV with a consideration of magnetic saturation of stator yoke", The Japan Society of Applied Electromagnetics and Mechanics, Vol. 19, No. 2, June 2011, the results of comparison between torque characteristics of two winding patterns (NNNSSS winding and NSNSNS winding) are disclosed with respect to a switched reluctance motor like the one described above. This document discloses that since the NSNSNS winding is not easily magnetically saturated compared to the NNNSSS winding, the maximum torque of the NSNSNS winding becomes greater than that of the NNNSSS winding.

SUMMARY

In Motoki Takeno and four others, "Improvement of torque characteristic of a 50 kW SRM for HEV with a consideration of magnetic saturation of stator yoke", The Japan Society of Applied Electromagnetics and Mechanics, Vol. 19, No. 2, June 2011, it is suggested that the maximum torque of the switched reluctance motor is improved by employing the NSNSNS winding. However, the torque efficiency (hereinafter referred to simply as the "efficiency") of each of the NNNSSS winding and the NSNSNS winding varies according to a load state of the switched reluctance motor. Therefore, if the NSNSNS winding is employed only in consideration of improving the maximum torque, there is a possibility of causing degradation of efficiency.

The disclosure has been made in view of the above and provides a control device for a switched reluctance motor, that can improve the maximum torque of the switched reluctance motor without degrading its efficiency.

Therefore, according to one aspect of the disclosure, there is provided a control device for a switched reluctance motor that is configured to be driven when excitation currents flow through three-phase coils. The control device includes an inverter and an electronic control unit. The inverter includes a switching circuit configured to switch a magnetic pole to provide a first winding pattern or a second winding pattern by changing a direction of current that flows in at least one phase of the three-phase coils. The first winding pattern is a winding pattern in which the three-phase coils are wound in the same direction. The second winding pattern is a winding pattern in which the two coils of the three-phase coils are wound in the same direction, the remaining one coil is wound in an opposite direction, and the two coils with the same winding direction and the one coil with the opposite winding direction are alternately arranged. The electronic control unit is configured to: with respect to a boundary dividing a driving range of the switched reluctance motor into a first range and a second range, the driving range determined by a torque and a rotational speed of the switched reluctance motor, (i) switch the magnetic pole by the switching circuit so as to provide the first winding pattern when the torque and the rotational speed that are determined according to an applied voltage are located in the first range on a low load side; (ii) switch the magnetic pole by the switching circuit so as to provide the second winding pattern when the torque and the rotational speed that are determined according to the applied voltage are located in the second range different from the first range; (iii) allow switching of the magnetic pole in a case where a current of the phase whose magnetic pole is to be switched among the three-phase coils is 0 when switching the magnetic pole by the switching circuit; and (iv) prohibit switching of the magnetic pole in a case where the current of the phase whose magnetic pole is to be switched is not 0.

According to the control device for the switched reluctance motor described above, it is possible to switch to the winding pattern, that is optimum in terms of efficiency, according to a load state of the switched reluctance motor. Further, since the control device for the switched reluctance motor switches the magnetic pole only in the case where the current of the phase whose magnetic pole is to be switched among the three-phase coils is 0, it is possible to suppress the occurrence of sparks and the heat generation of the inverter upon switching the magnetic pole.

In the above-described control device for the switched reluctance motor, the electronic control unit may be configured to: (i) switch between intermittent current control in which there is a period where a current that flows through each of the three-phase coils becomes 0, and continuous current control in which there is no period where a current that flows through each of the three-phase coils becomes 0, according to the torque and the rotational speed of the switched reluctance motor; and (ii) perform the switching from the intermittent current control to the continuous current control after the magnetic pole is switched by the switching circuit, when the electronic control unit switches the magnetic pole by the switching circuit after switching from the intermittent current control to the continuous current control.

According to the control device for the switched reluctance motor described above, the magnetic pole is not switched during the continuous current control in which there is no period where a current that flows through each of the coils becomes 0, but is switched during the intermittent current control in which there is a period where a current that flows through each of the coils becomes 0. Therefore, it is possible to further suppress the occurrence of sparks and the heat generation of the inverter upon switching the magnetic pole.

In the above-described control device for the switched reluctance motor, the second range when the voltage applied to the switched reluctance motor is low may be wider than the second range when the voltage applied to the switched reluctance motor is high.

According to the control device for the switched reluctance motor described above, it is possible to switch to the optimum winding pattern while also taking into account that an efficient range in each of the winding patterns changes depending on voltage.

In the above-described control device for the switched reluctance motor, a deadband in which switching between the first winding pattern and the second winding pattern is not performed may be provided at the boundary between the first range and the second range.

According to the control device for the switched reluctance motor described above, by providing the deadband, switching loss due to frequent switching of the winding pattern can be suppressed, for example.

In the above-described control device for the switched reluctance motor, the inverter may include switching circuits for a plurality of phases.

According to the control device for the switched reluctance motor described above, since the plurality of switching circuits take charge of switching operations, the load of the inverter due to frequent switching of the winding pattern can be distributed, for example.

According to the control device for the switched reluctance motor of the disclosure, by switching the magnetic pole to provide the first winding pattern in a low load range and switching the magnetic pole to provide the second winding pattern in a high load range other than the low load range, it is possible to improve the maximum torque of the switched reluctance motor without degrading the efficiency of the switched reluctance motor. In addition, by switching the magnetic pole at the proper timing, it is possible to suppress the occurrence of sparks and the heat generation of the inverter upon switching the magnetic pole, thereby suppressing degradation in durability of the inverter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A control device for a switched reluctance motor according to an embodiment of the disclosure will be described with reference to the drawings. The disclosure is not limited to the embodiment described below. Further, components in the following embodiment may be replaced with components that are apparent for those skilled in the art or that are substantially the same as those in the following embodiment.

Figure 1:
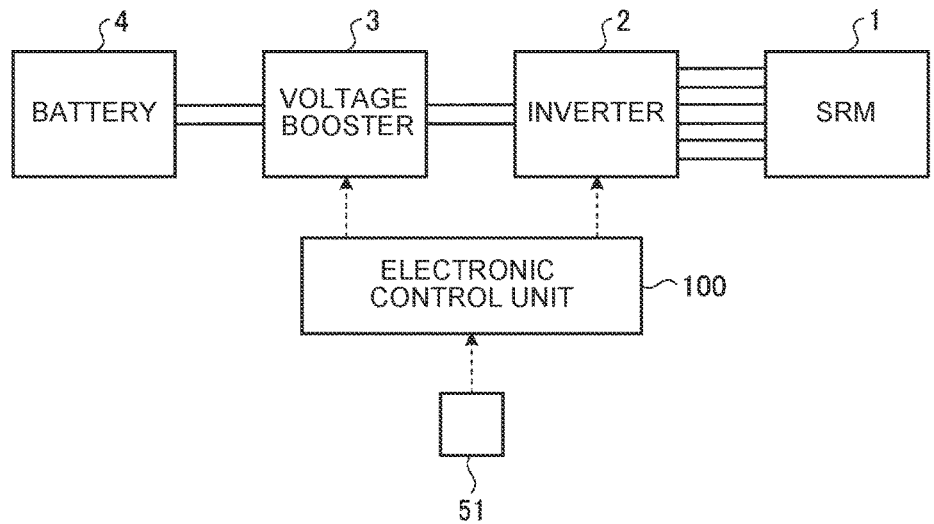
FIG. 1 is a diagram schematically showing a system configuration including a control device for a switched reluctance motor according to an embodiment of the disclosure.

First, a system configuration of this embodiment will be described. As shown in FIG. 1, the system configuration of this embodiment includes a switched reluctance motor (hereinafter referred to as an "SR motor" or "SRM") 1, an inverter 2, a voltage booster 3, a battery 4, and an electronic control unit (ECU) 100. A control device for the SR motor 1 according to this embodiment includes at least the inverter 2 and the electronic control unit 100.

As shown in FIG. 1, the SR motor 1 is electrically connected to the battery 4 via the inverter 2 and the voltage booster 3. The SR motor 1 and the inverter 2 are electrically connected to each other via coils 12 (see FIG. 2). The SR motor 1 functions as not only an electric motor, but also an electric generator.

Figure 2:
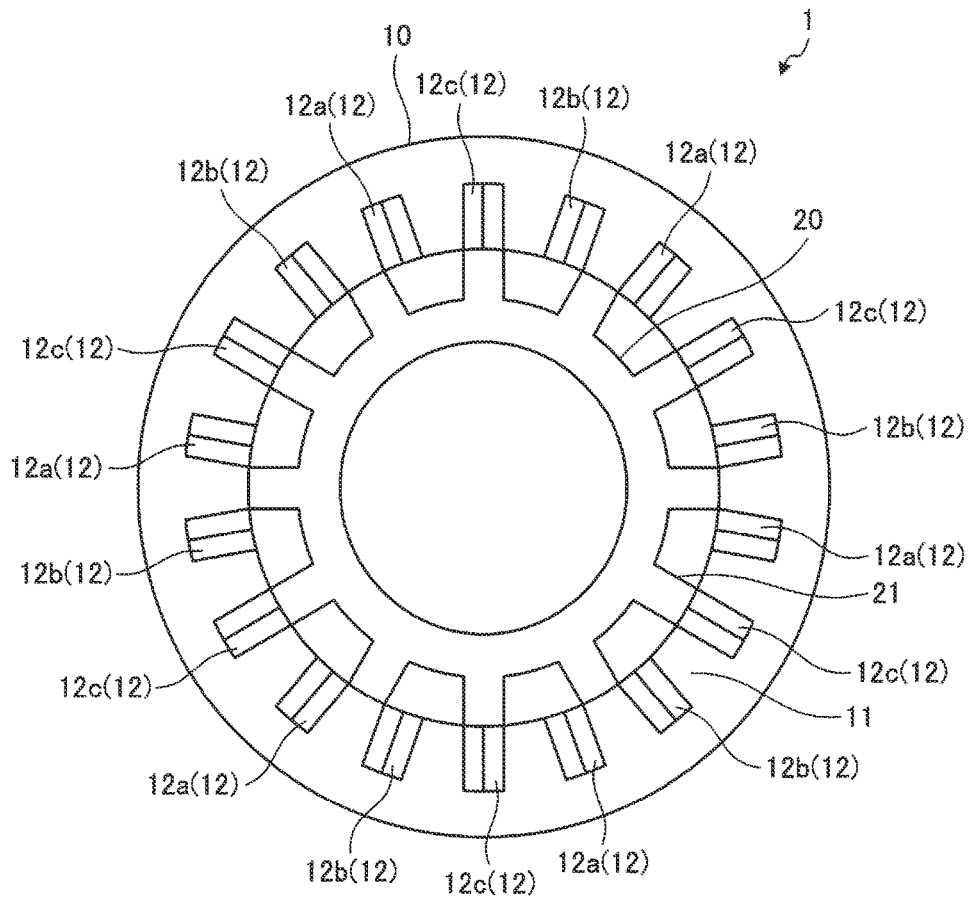
FIG. 2 is a diagram schematically showing a configuration of the switched reluctance motor in the control device for the switched reluctance motor according to the embodiment of the disclosure.

The SR motor 1 is an electric motor that does not use a permanent magnet in a rotor, and is driven by the flow of excitation currents (hereinafter referred to as "currents") through the three-phase coils 12. As shown in FIG. 2, the SR motor 1 includes a stator 10 of a salient-pole structure and a rotor 20 of a salient-pole structure. In FIG. 2, as the SR motor 1, a three-phase induction motor including an 18-pole stator 10 and a 12-pole rotor 20 is shown by way of example.

The SR motor 1 of the three-phase alternating-current type has phase A (phase U) formed of a pair of stator teeth 11 and a corresponding coil 12a, phase B (phase V) formed of a pair of stator teeth 11 and a corresponding coil 12b, and phase C (phase W) formed of a pair of stator teeth 11 and a corresponding coil 12c.

As shown in FIG. 2, the stator 10 includes the plurality of stator teeth 11 as salient poles in its annular inner peripheral portion. The coils 12 connected to the inverter 2 are respectively wound around the stator teeth 11.

The rotor 20 is disposed radially inward of the stator 10 and includes a plurality of rotor teeth 21 as salient poles in its annular outer peripheral portion. The rotor 20 is configured to rotate together with a rotor shaft (not shown).

Figure 3:
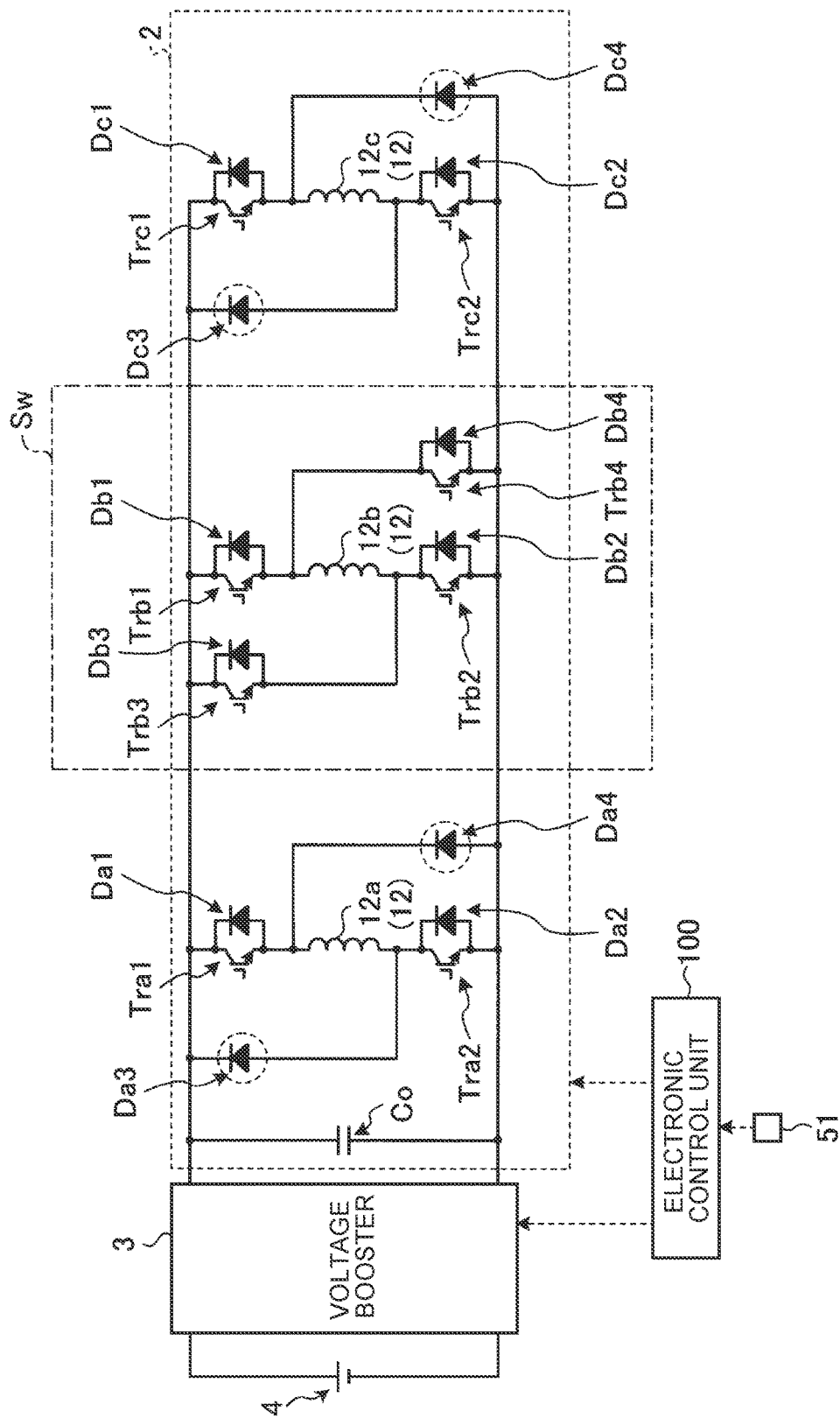
FIG. 3 is a diagram schematically showing a configuration of an inverter in the control device for the switched reluctance motor according to the embodiment of the disclosure.

As shown in FIG. 3, the inverter 2 is constituted by an electric circuit (inverter circuit) including a plurality of switching elements for supplying three-phase currents to the coils 12. The inverter 2 supplies a current per phase to the coil 12a, 12b, or 12c connected to the inverter circuit.

The inverter circuit constituting the inverter 2 includes a plurality of transistors and a plurality of diodes, provided per phase, and one capacitor Co. For each phase, the inverter 2 simultaneously turns on or off the plurality of transistors to change a current value that flows through the coil 12.

The inverter 2 includes transistors Tra1 and Tra2 and diodes Da1, Da2, Da3, and Da4 around the coil 12a of phase A. The inverter 2 includes transistors Trb1, Trb2, Trb3, and Trb4 and diodes Db1, Db2, Db3, and Db4 around the coil 12b of phase B. The inverter 2 includes transistors Trc1 and Trc2 and diodes Dc1, Dc2, Dc3, and Dc4 around the coil 12c of phase C. A circuit (see one-dot chain line) including the coil 12b of phase B functions as a switching circuit Sw for switching the winding pattern of the SR motor 1 as will be described in detail later.

The voltage booster 3 is provided between the inverter 2 and the battery 4 and boots a voltage that is applied to the SR motor 1. The voltage booster 3 is constituted by, for example, a boost converter and controlled by the electronic control unit 100.

The electronic control unit 100 controls the driving of the SR motor 1. The electronic control unit 100 includes a CPU, a storage unit storing data such as various programs, and an electronic control unit that performs various calculations for controlling the driving of the SR motor 1. As a result of the calculations in the electronic control unit, a command signal for controlling the inverter 2 is output to the inverter 2 from the electronic control unit 100. In this way, by controlling the inverter 2, the electronic control unit 100 controls the voltage and current that are applied to the SR motor 1. As will be described later, the electronic control unit 100 switches the winding pattern of the SR motor 1 by controlling the inverter 2 (see FIGS. 4 and 5).

A resolver signal is input to the electronic control unit 100 from a rotational speed sensor 51 that detects the rotational speed of the SR motor 1. Based on a relative positional relationship between the stator teeth 11 and the rotor teeth 21 in a rotational direction of the SR motor 1 calculated from the resolver signal, the electronic control unit 100 performs control of repeatedly switching the coil 12 to be energized from one phase to another. In this control, the electronic control unit 100 supplies a current to the coil 12 of a certain phase to excite the corresponding stator teeth 11 so as to generate a magnetic attraction force between the excited stator teeth 11 and the rotor teeth 21 located near the excited stator teeth 11, thereby rotating the rotor 20.

Next, the switching of the winding pattern will be described. By changing the direction of current that flows through the coil 12b of phase B, the switching circuit Sw of the inverter 2 can switch the magnetic pole so that the winding pattern (magnetic pole arrangement pattern) of the SR motor 1 becomes NNNSSS winding (first winding pattern) or NSNSNS winding (second winding pattern).

Figure 4:
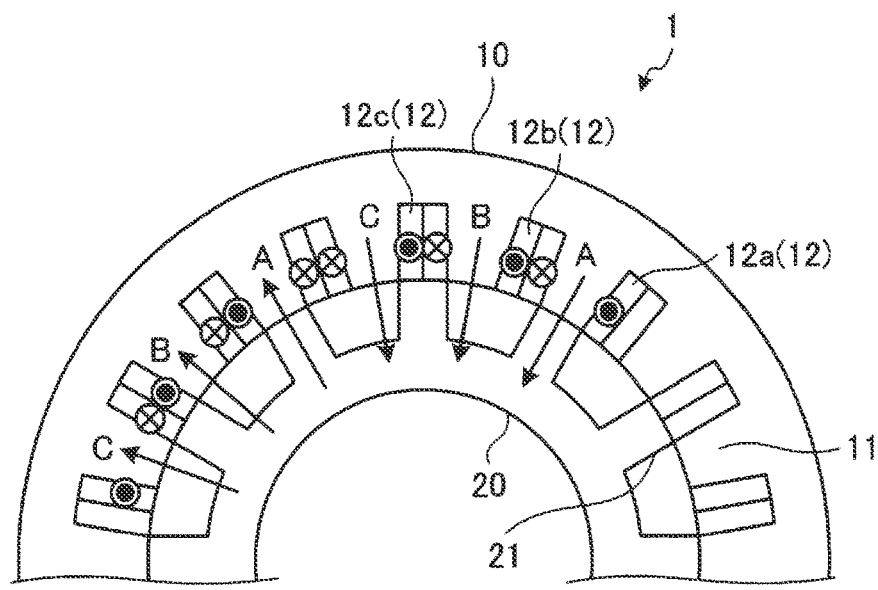
FIG. 4 is a diagram showing a case where the magnetic poles are switched so that the winding pattern becomes NNNSSS winding in the control device for the switched reluctance motor according to the embodiment of the disclosure.

By changing the direction of current that flows through the coil 12b in the switching circuit Sw, the magnetic poles of adjacent phases A, B, and C can be arranged the same as each other as shown in FIG. 4, for example. That is, in FIG. 4, the phases are arranged from the right in the order of phase A, phase B, phase C, phase A, phase B, and phase C, and the magnetic poles thereof are in the order of N-pole, N-pole, N-pole, S-pole, S-pole, and S-pole.

The winding pattern in which the three-phase coils 12a, 12b, and 12c are wound in the same direction as described above is called "NNNSSS winding". In FIG. 4, arrows each indicate a direction in which current flows (the same applies to FIG. 5).

Figure 5:
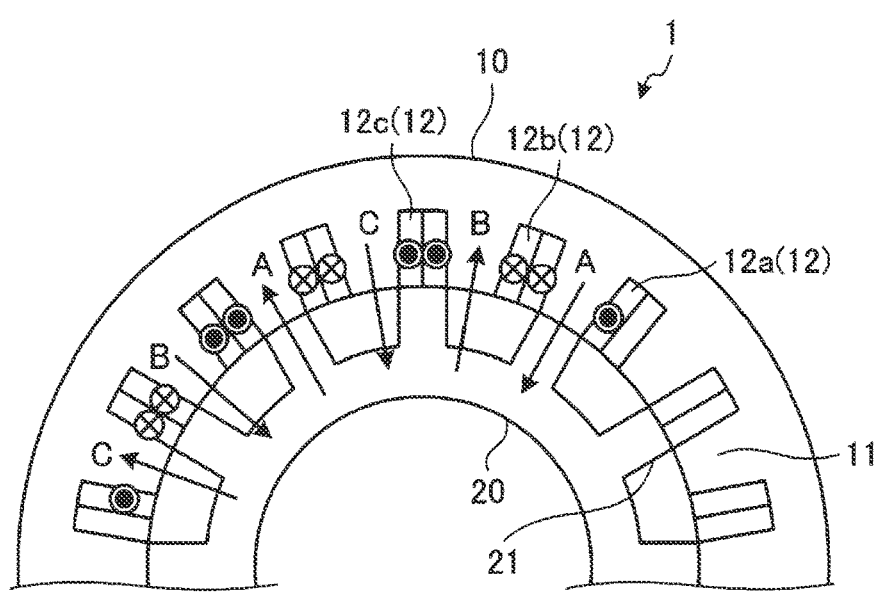
FIG. 5 is a diagram showing a case where the magnetic poles are switched so that the winding pattern becomes NSNSNS winding in the control device for the switched reluctance motor according to the embodiment of the disclosure.

On the other hand, by changing the direction of current that flows through the coil 12b in the switching circuit Sw of the inverter 2, the magnetic poles can be arranged such that only the magnetic pole of phase B is opposite in the magnetic poles of adjacent phases A, B, and C as shown in FIG. 5, for example. That is, in FIG. 5, the phases are arranged from the right in the order of phase A, phase B, phase C, phase A, phase B, and phase C, and the magnetic poles thereof are in the order of N-pole, S-pole, N-pole, S-pole, N-pole, and S-pole.

The winding pattern in which, as described above, two (herein the coils 12a and 12c) of the three-phase coils 12a, 12b, and 12c are wound in the same direction with the remaining one (herein the coil 12b) wound in the opposite direction, and further, the two coils 12a and 12c with the same winding direction and the one coil 12b with the opposite winding direction are alternately arranged is called "NSNSNS winding". Note that "the two coils 12a and 12c with the same winding direction and the one coil 12b with the opposite winding direction are alternately arranged" specifically represents a state where the coil 12b is arranged between the coil 12a and the coil 12c in a circumferential direction of the stator 10 as shown in FIG. 5.

In the control device for the SR motor 1 according to this embodiment, the two winding patterns (see FIGS. 4 and 5) are switched therebetween by the switching circuit Sw during the driving of the SR motor 1. On the other hand, as described above, the efficiency of each of the NNNSSS winding and the NSNSNS winding varies according to a load state of the SR motor 1.

Figure 6:
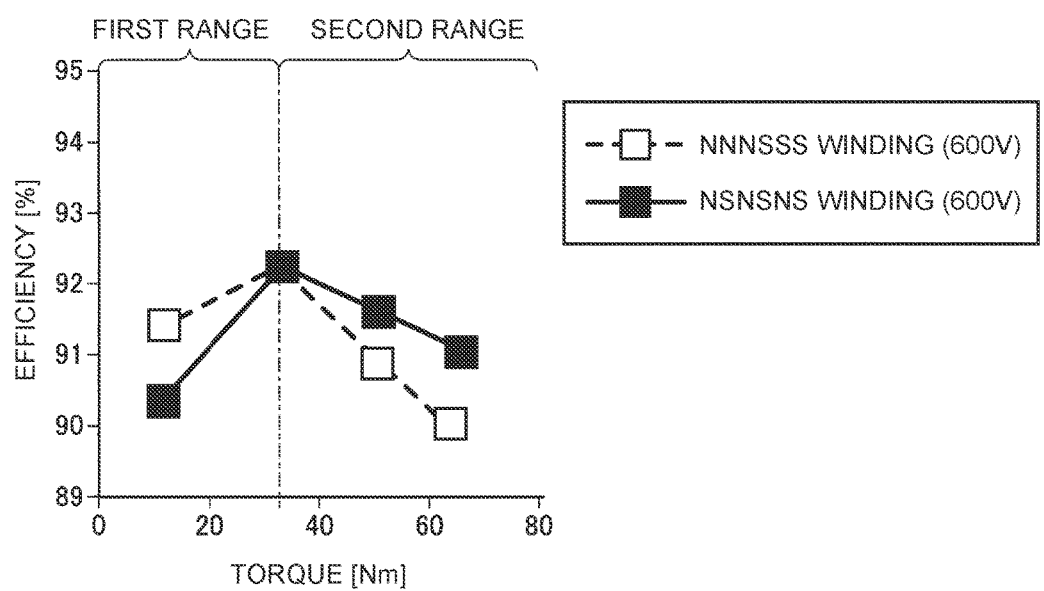
FIG. 6 is a graph showing a relationship between the torque and the efficiency in each winding pattern.

FIG. 6 shows a relationship between the load (torque) and the efficiency in each of the winding patterns (NNNSSS winding and NSNSNS winding) when a voltage of 600V is applied to the SR motor 1. As shown in FIG. 6, in a first range being a range on the low load (low torque) side, the efficiency of the NNNSSS winding is relatively higher than that of the NSNSNS winding. On the other hand, in a second range being a range on the high load (high torque) side, the efficiency of the NSNSNS winding is relatively higher than that of the NNNSSS winding.

Based on the knowledge described above, in the control device for the SR motor 1 according to this embodiment, the winding pattern is switched to either of the NNNSSS winding and the NSNSNS winding according to a load state of the SR motor 1 during the driving of the SR motor 1. Specifically, the electronic control unit 100 for the SR motor 1 switches the magnetic pole so that the winding pattern becomes the NNNSSS winding in the low load (low torque) range like the first range in FIG. 6, while the electronic control unit 100 for the SR motor 1 switches the magnetic pole so that the winding pattern becomes the NSNSNS winding in the high load (high torque) range like the second range in FIG. 6. This makes it possible to switch the winding pattern to the optimum winding pattern according to an efficient range in each of the NNNSSS winding and the NSNSNS winding.

In the control device for the SR motor 1 according to this embodiment, when a magnetic pole switching condition is satisfied, the switching circuit Sw does not switch the magnetic pole immediately, but switches the magnetic pole at an optimal timing in consideration of a state of current in the SR motor 1. Specifically, when switching the magnetic pole using the switching circuit Sw, the electronic control unit 100 for the SR motor 1 allows switching of the magnetic pole in the case where a current of the phase whose magnetic pole is to be switched (the coil 12b in FIG. 3) among the three-phase coils 12a, 12b, and 12c is 0 (or close to 0), and prohibits switching of the magnetic pole in the case where a current of the phase whose magnetic pole is to be switched is not 0 (or close to 0). Consequently, even when the magnetic pole switching condition is established, the magnetic pole is switched only in the case where a current of the phase whose magnetic pole is to be switched (the coil 12b) among the three-phase coils 12a, 12b, and 12c is 0, so that it is possible to suppress the occurrence of sparks and the heat generation of the inverter 2 upon switching the magnetic pole.

Next, a first embodiment of a driving control method by the control device for the SR motor 1 according to this embodiment will be described with reference to FIGS. 7 to 12.

First, the electronic control unit 100 reads various information for use in controlling the driving of the SR motor 1 (step S1). Note that "various information" described above are specifically a resolver signal that is input from the rotational speed sensor 51, and a required torque of the SR motor 1.

Then, the electronic control unit 100 calculates a rotational speed of the SR motor 1 (hereinafter referred to as a "motor rotational speed") based on the resolver signal of the rotational speed sensor 51 (step S2). Then, the electronic control unit 100 derives a motor torque command value corresponding to the required torque (step S3). Then, the electronic control unit 100 calculates a voltage adjustable range based on a vehicle state and so on (step S4). Note that "voltage adjustable range" described above represents a range of voltage that is applied to the SR motor 1. Then, the electronic control unit 100 determines a voltage, that is applied to the SR motor 1, based on the vehicle state and so on (step S5).

Then, the electronic control unit 100 determines whether or not switching of the magnetic pole, i.e. switching of the winding pattern, is necessary (step S6). At this step, specifically, by referring to a switching map shown in FIG. 8, the electronic control unit 100 determines whether or not switching of the magnetic pole is necessary.

Figure 8:
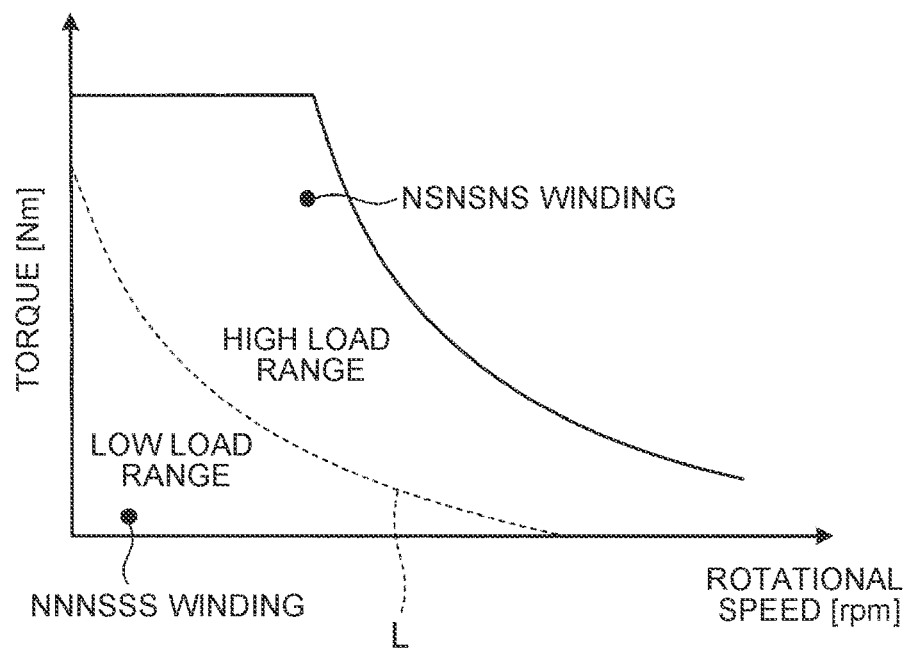
FIG. 8 is a graph showing the characteristics of the switched reluctance motor when a high voltage (600V) is applied to the switched reluctance motor in the control device for the switched reluctance motor according to the embodiment of the disclosure.

Specifically, the switching map shown in FIG. 8 defines a driving range of the SR motor 1 that is determined by the torque and rotational speed of the SR motor 1. In the switching map of FIG. 8, the driving range of the SR motor 1 is divided into two ranges, i.e. a low load range (first range) and a high load range (second range), with a predetermined switching line L as a boundary therebetween.

The low load range is a range where the torque and rotational speed are relatively low, and more specifically, is a range where the torque and rotational speed are lower than the switching line L in the driving range of the SR motor 1. The high load range is a range where the torque and rotational speed are relatively high, and more specifically, is a range where the torque and rotational speed are higher than the switching line L in the driving range of the SR motor 1. As shown in FIG. 8, the switching line L is formed by a curved line such that the higher the torque, the lower the rotational speed and that the lower the torque, the higher the rotational speed. The switching line L may be formed by, for example, a straight line such that the higher the torque, the lower the rotational speed and that the lower the torque, the higher the rotational speed.

Figure 9:
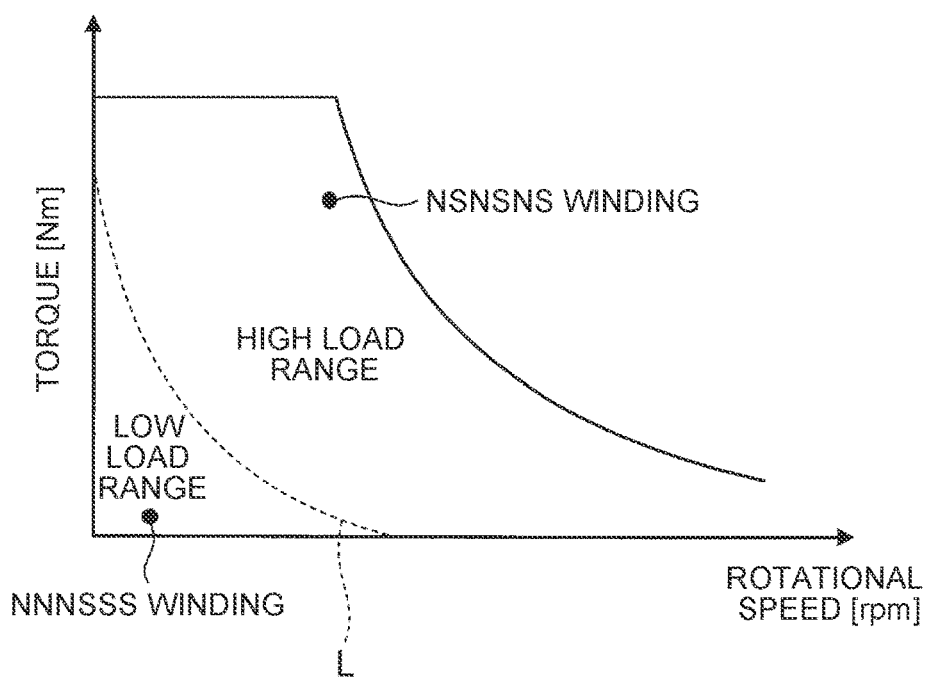
FIG. 9 is a graph showing the characteristics of the switched reluctance motor when a low voltage (300V) is applied to the switched reluctance motor in the control device for the switched reluctance motor according to the embodiment of the disclosure.

At this step, a different switching map is used depending on the voltage determined at step S5. For example, when the voltage determined at step S5 is a high voltage (e.g. 600V), the switching map (switching map for high voltage) shown in FIG. 8 is used. On the other hand, when the voltage determined at step S5 is a low voltage (e.g. 300V), a switching map (switching map for low voltage) shown in FIG. 9 is used. As shown in FIG. 9, a high load range of the low-voltage switching map is wider than the high load range of the high-voltage switching map (see FIG. 8), while a low load range of the low-voltage switching map is narrower than the low load range of the high-voltage switching map.

The low-voltage switching map shown in FIG. 9 is configured such that the ratio of the high load range to the low load range in the driving range is large compared to the high-voltage switching map (see FIG. 8). That is, as the voltage that is applied to the SR motor 1 is set lower, the electronic control unit 100 uses a switching map with a greater ratio of a high load range to a low load range in a driving range at this step. This makes it possible to switch the winding pattern to the optimum winding pattern while also taking into account that an efficient range in each of the NNNSSS winding and the NSNSNS winding changes depending on voltage.

At step S6, the electronic control unit 100 determines in which range of the switching map an operating point determined by the motor rotational speed and the motor torque command value is located. That is, the electronic control unit 100 determines whether the motor rotational speed and the motor torque command value, determined according to the applied voltage, are located on the low load range side or on the high load range side, different from the low load range, with respect to the boundary (the switching line L of the switching map) dividing the driving range of the SR motor 1 into the two ranges.

For example, when the current winding pattern is the NNNSSS winding and the operating point determined by the motor rotational speed and the motor torque command value is located on the high load range side, or when the current winding pattern is the NNNSSS winding and the operating point located on the low load range side is expected to exceed the switching line L so as to move to the high load range side, the electronic control unit 100 determines that switching of the magnetic pole (switching from the NNNSSS winding to the NSNSNS winding) is necessary. On the other hand, when the current winding pattern is the NSNSNS winding and the operating point determined by the motor rotational speed and the motor torque command value is located on the low load range side, or when the current winding pattern is the NSNSNS winding and the operating point located on the high load range side is expected to exceed the switching line L so as to move to the low load range side, the electronic control unit 100 determines that switching of the magnetic pole (switching from the NSNSNS winding to the NNNSSS winding) is necessary.

When the electronic control unit 100 has determined that the switching of the magnetic pole is necessary (Yes at step S6), the electronic control unit 100 determines whether or not a current flowing through the coil 12b, being the phase whose magnetic pole is to be switched (hereinafter referred to as a "magnetic pole switching phase") among the three-phase coils 12a, 12b, and 12c, is 0 (step S7).

Figure 10:
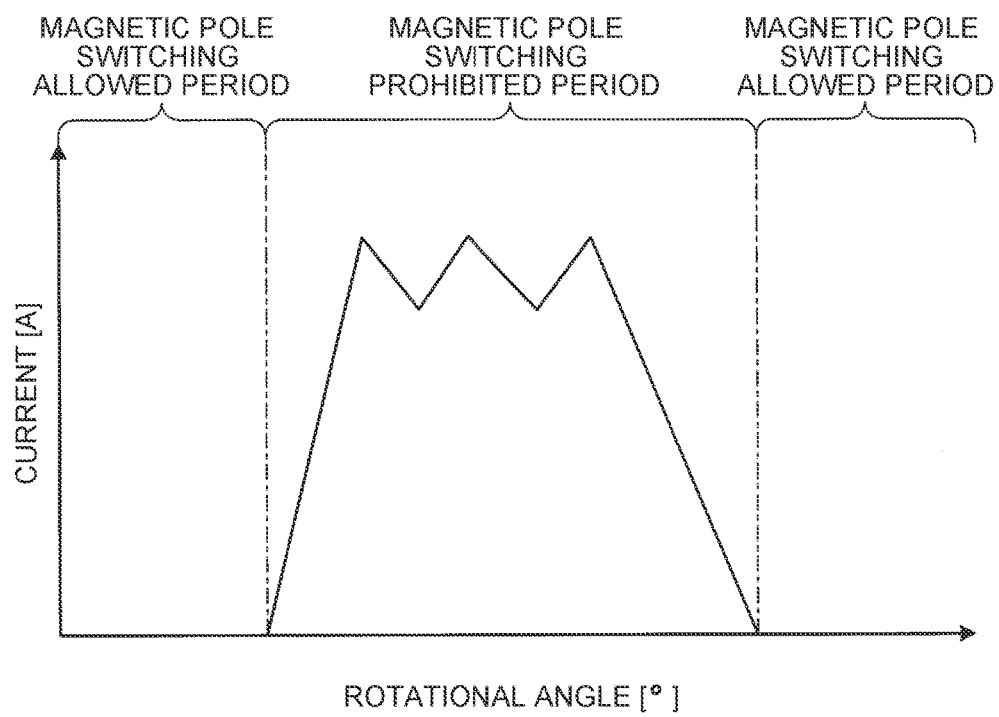
FIG. 10 is a graph showing magnetic pole switching allowed periods and a magnetic pole switching prohibited period in the control device for the switched reluctance motor according to the embodiment of the disclosure.

Herein, if, when the magnetic pole switching condition is satisfied at step S6, the magnetic pole is switched in a state where current is flowing through the coil 12b being the magnetic pole switching phase, there is a possibility that the durability of the inverter 2 is lowered due to the occurrence of sparks at the coil 12b or the heat generation of the inverter 2. Therefore, in this embodiment, as shown in FIG. 10, a period in which a current flowing through the coil 12b of the magnetic pole switching phase is not 0 is set to a magnetic pole switching prohibited period, while a period in which a current flowing through the coil 12b of the magnetic pole switching phase is 0 is set to a magnetic pole switching allowed period.

Note that "a current flowing through the coil 12b is 0" includes not only a case where the current value is 0 A, but also a case where "a current flowing through the coil 12b is close to 0 A". A specific current value of "close to 0 A" is set to, for example, a current value (>0 A) of the coil 12b when the calorific value of the inverter 2 upon switching the magnetic pole is equal to or less than a predetermined threshold value, a current value (>0 A) in consideration of an error of a current sensor (not shown) that detects a current flowing through the coil 12b, or the like.

When the electronic control unit 100 has determined that the current flowing in the magnetic pole switching phase (coil 12b) is 0 (or close to 0) (Yes at step S7), the electronic control unit 100 switches the magnetic pole (step S8), i.e. switches the winding pattern to either of the NNNSSS winding and the NSNSNS winding according to the determination result at step S6, and ends this routine. Details of the process at step S8 will be described later (see later-described FIG. 11).

When the electronic control unit 100 has determined at step S6 that the switching of the magnetic pole is not necessary (No at step S6), the electronic control unit 100 maintains the current magnetic poles (winding pattern) (step S9) and returns to determination at step S6. When the electronic control unit 100 has determined at step S7 that the current flowing in the magnetic pole switching phase (coil 12b) is not 0 (or close to 0) (No at step S7), the electronic control unit 100 maintains the current magnetic poles (step S10) and returns to determination at step S7.

Figure 7:
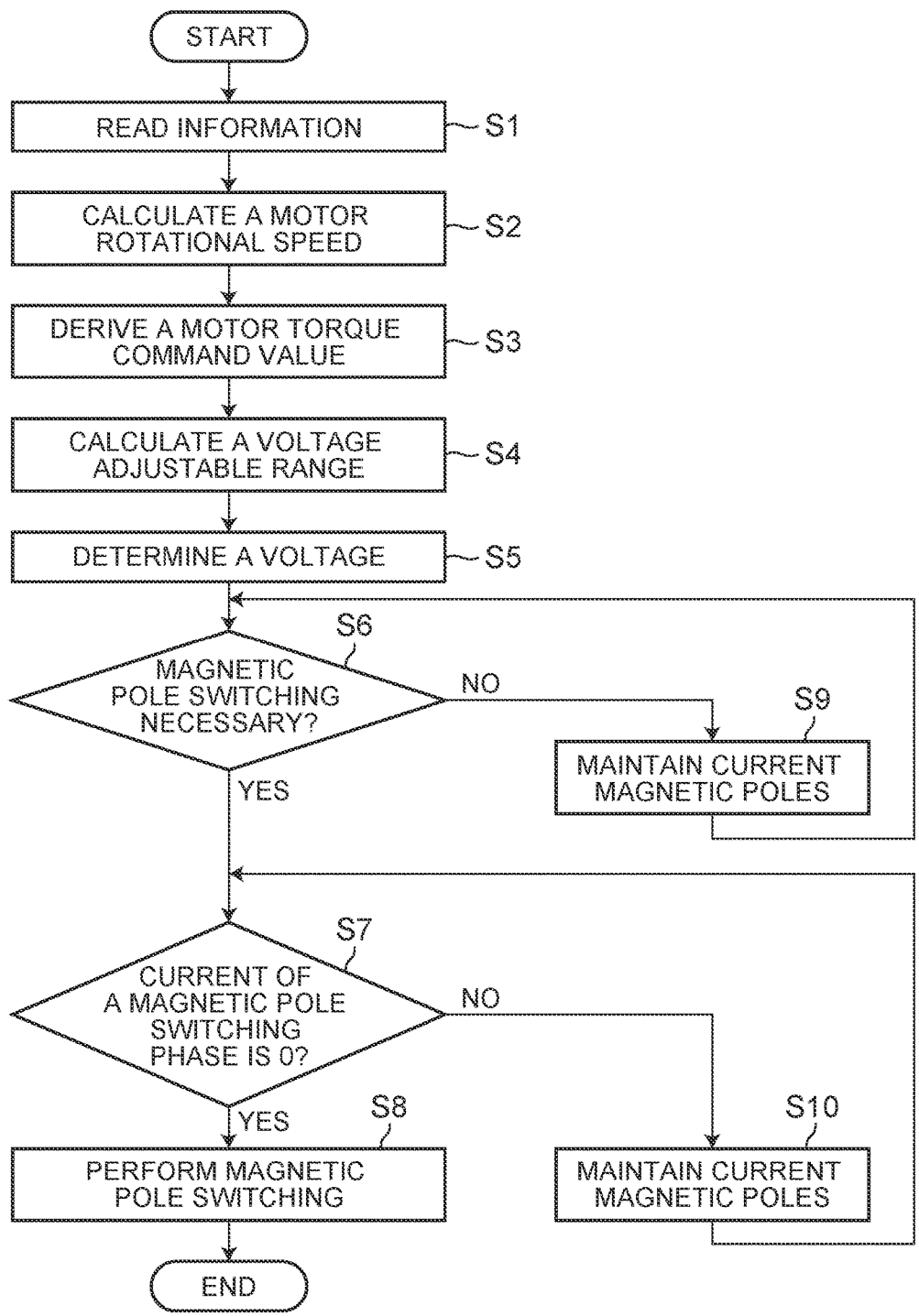
FIG. 7 is a flowchart showing a first embodiment of a driving control method by the control device for the switched reluctance motor according to the embodiment of the disclosure.
Figure 11:
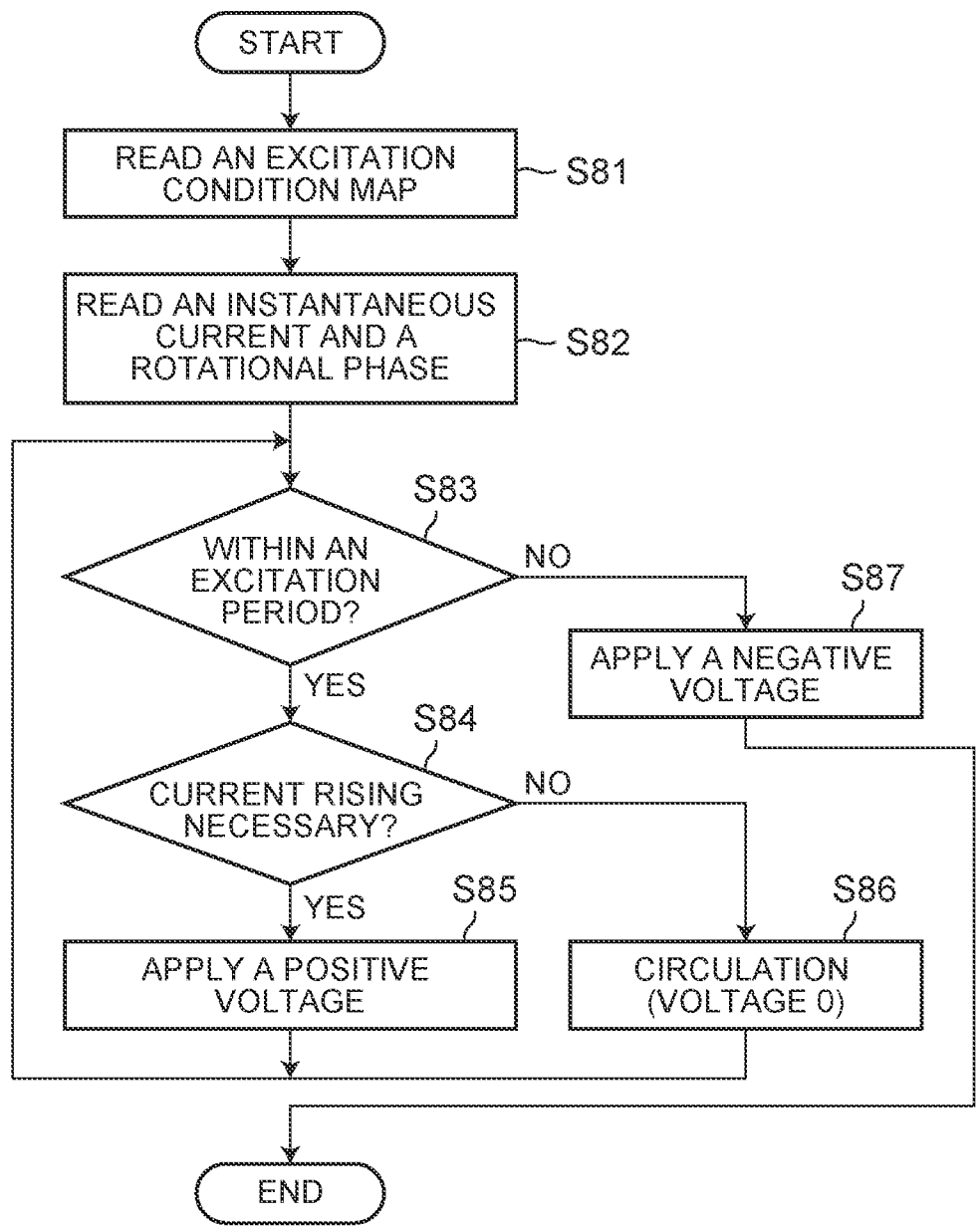
FIG. 11 is a flowchart showing details of magnetic pole switching in the driving control method by the control device for the switched reluctance motor according to the embodiment of the disclosure.

Hereinbelow, details of the magnetic pole switching process at step S8 in FIG. 7 will be described with reference to FIG. 11. First, the electronic control unit 100 changes the direction of current that flows in the magnetic pole switching phase (coil 12b), thereby switching the magnetic pole so that the winding pattern of the SR motor 1 becomes the NNNSSS winding or the NSNSNS winding, and reads an excitation condition map for the selected winding pattern (step S81).

Figure 12:
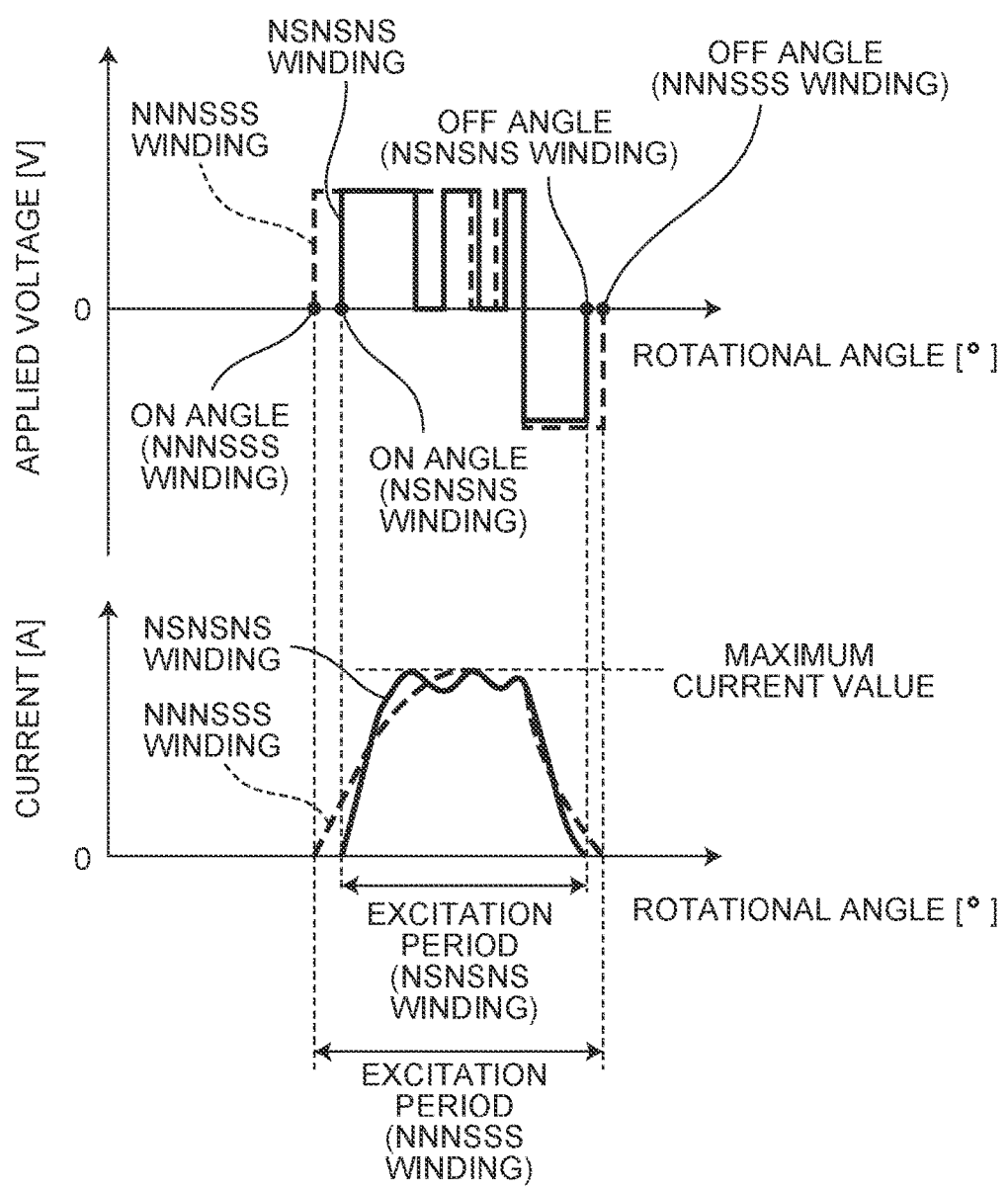
FIG. 12 is a graph showing excitation conditions and a current waveform for each winding pattern in the control device for the switched reluctance motor according to the embodiment of the disclosure.

At this step, the electronic control unit 100 reads the excitation condition map in which an ON angle (excitation start angle), an OFF angle (excitation end angle), a maximum current value, and so on are described as shown in FIG. 12. In FIG. 12, the excitation conditions of both the NNNSSS winding and the NSNSNS winding are shown on the same map in a superimposed manner. However, actually, only the excitation conditions of the NNNSSS winding are described in an excitation condition map for the NNNSSS winding, while only the excitation conditions of the NSNSNS winding are described in an excitation condition map for the NSNSNS winding. The excitation conditions (e.g. an ON angle and an OFF angle) differ between the NNNSSS winding and the NSNSNS winding. FIG. 12 shows by way of example the excitation conditions such that an excitation period (excitation width) of the NNNSSS winding becomes greater than an excitation period (excitation width) of the NSNSNS winding.

Then, the electronic control unit 100 reads a current (instantaneous current) flowing through the coil 12 of each phase and a rotational phase (rotational angle) of the rotor 20 (step S82). At this step, the electronic control unit 100 reads a current actually flowing through the coil 12 of a certain phase based on a detection signal from a current sensor (not shown). Further, the electronic control unit 100 detects a rotational phase of the rotor 20 based on the resolver signal of the rotational speed sensor 51.

Then, the electronic control unit 100 determines whether or not it is within an excitation period, based on the rotational phase of the rotor 20 (step S83). Herein, "excitation period" described above represents a rotational angle range (excitation width) from an ON angle (excitation start angle) to an OFF angle (excitation end angle) as shown in FIG. 12. When the electronic control unit 100 has determined that it is within the excitation period (Yes at step S83), the electronic control unit 100 determines whether or not current rising is necessary, based on the excitation condition map (see FIG. 12) (step S84).

When the electronic control unit 100 has determined that the current rising is necessary (Yes at step S84), the electronic control unit 100 performs a "positive voltage mode" of applying a positive voltage to the coil 12 (step S85) and returns to the process of step S83. On the other hand, when the electronic control unit 100 has determined that the current rising is not necessary (No at step S84), the electronic control unit 100 performs a "circulation mode" of making zero a voltage that is applied to the coil 12 (step S86), and returns to the process of step S83. When the electronic control unit 100 has determined at step S83 that it is not within the excitation period (No at step S83), the electronic control unit 100 performs a "negative voltage mode" of applying a negative voltage to the coil 12 (step S87) and ends this routine.

As described above, by providing the switching circuit Sw, the control device for the SR motor 1 according to this embodiment can switch the winding pattern of the coils 12 during the driving of the SR motor 1. That is, conventionally, either of the winding patterns, i.e. the NNNSSS winding and the NSNSNS winding, is uniquely determined by the hardware configuration of an inverter, and thus it is impossible to change the winding pattern during the driving of the SR motor 1. On the other hand, in the case of the control device for the SR motor 1 according to this embodiment, it is possible to switch to the winding pattern, that is optimum in terms of efficiency, according to a load state of the SR motor 1.

The control device for the SR motor 1 according to this embodiment can improve the maximum torque of the SR motor 1 without degrading the efficiency of the SR motor 1 by switching the magnetic pole to provide the NNNSSS winding in the low load range (see FIG. 4) and switching the magnetic pole to provide the NSNSNS winding in the high load range (see FIG. 5).

Figure 13:
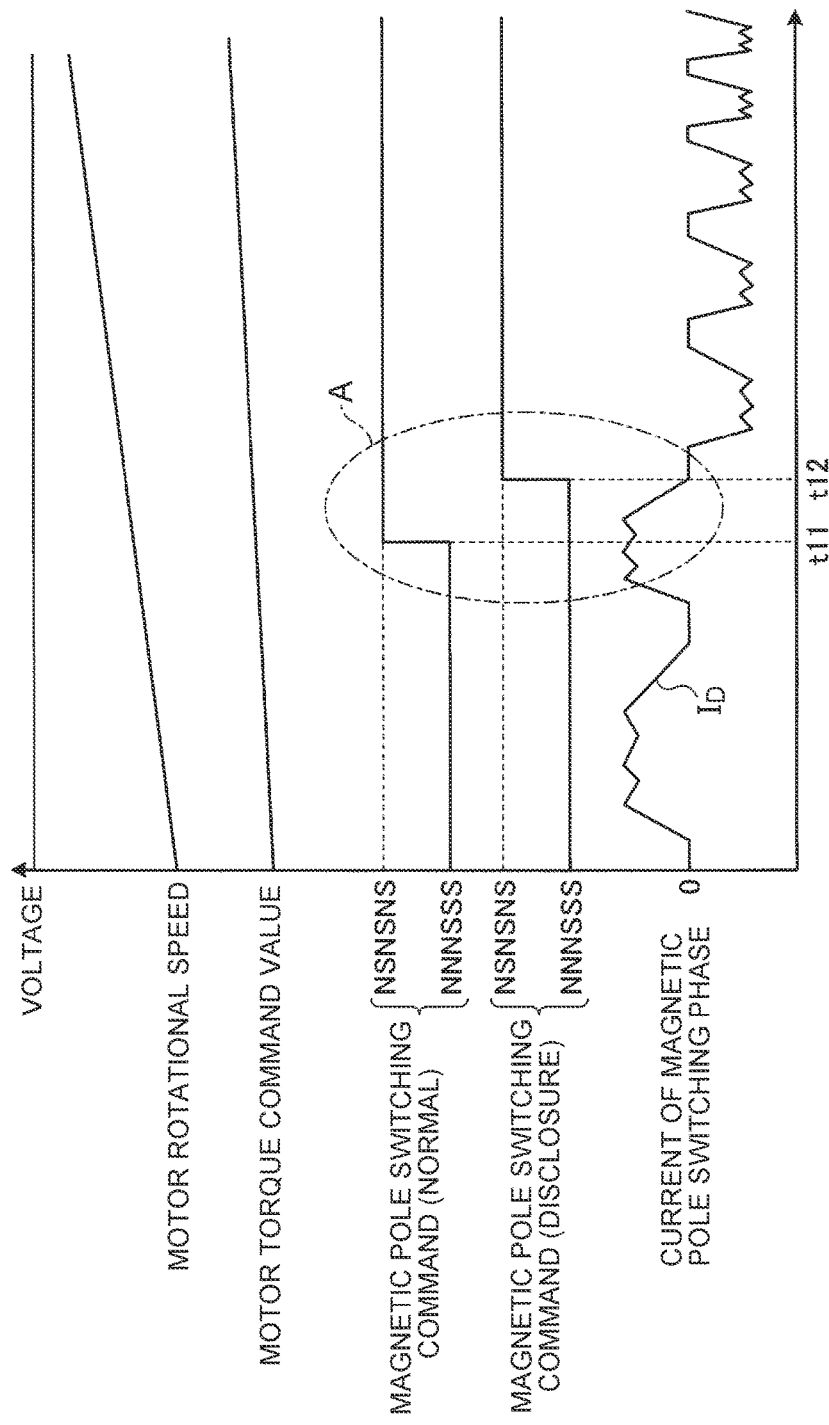
FIG. 13 is a time chart showing a state of the switched reluctance motor when driving control is performed by the first embodiment of the driving control method by the control device for the switched reluctance motor according to the embodiment of the disclosure.

As shown at a portion A in FIG. 13, the control device for the SR motor 1 according to this embodiment does not switch the magnetic pole immediately at a time point (=t11) when the magnetic pole switching condition is established (see "MAGNETIC POLE SWITCHING COMMAND (NORMAL)"), but switches the magnetic pole at a time point (=t12) when the magnetic pole switching condition is established and further a current of the magnetic pole switching phase (coil 12*b*) has become 0 (or close to 0) (see "MAGNETIC POLE SWITCHING COMMAND (DISCLOSURE)").

In this way, by switching the magnetic pole at the proper timing, the control device for the SR motor 1 according to this embodiment can suppress the occurrence of sparks and the heat generation of the inverter 2 upon switching the magnetic pole, thereby suppressing degradation in durability of the inverter 2. Further, it is possible to suppress torque fluctuation, vibration degradation, and degradation in efficiency which are otherwise caused by a rapid change in current flowing in the SR motor 1 upon switching the magnetic pole. As shown at "CURRENT OF MAGNETIC POLE SWITCHING PHASE" in FIG. 13, when the magnetic pole is switched, the polarity of current is reversed.

Figure 14:
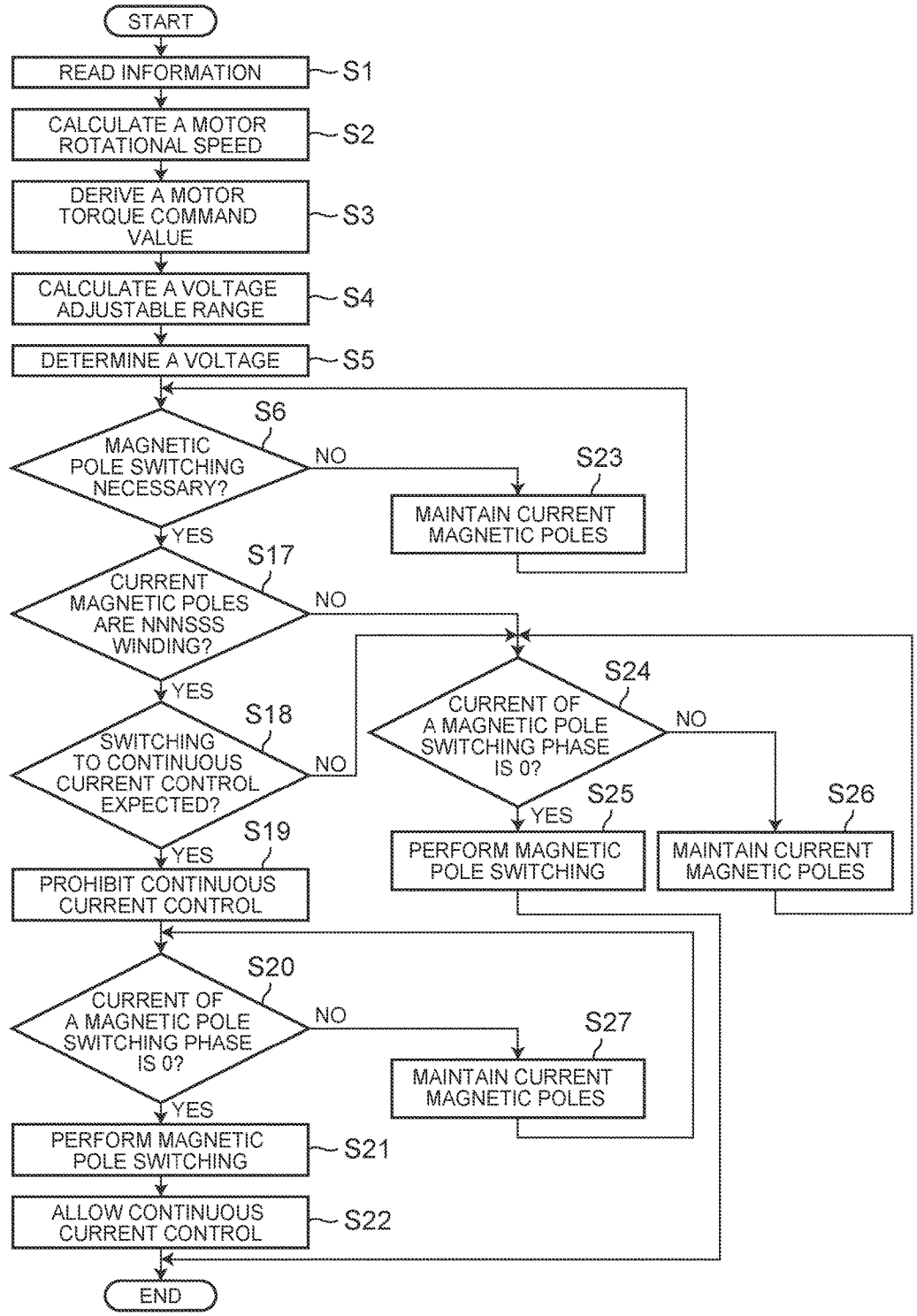
FIG. 14 is a flowchart showing a second embodiment of a driving control method by the control device for the switched reluctance motor according to the embodiment of the disclosure.

Next, a second embodiment of a driving control method by the control device for the SR motor 1 according to this embodiment will be described with reference to FIGS. 14 and 15.

Herein, when performing current control of the SR motor 1, the electronic control unit 100 switches between intermittent current control (current discontinuous mode) and continuous current control (current continuous mode) according to a motor rotational speed and a motor torque command value of the SR motor 1.

The intermittent current control is a current control method (excitation method) in which there is a period where a current that flows through each of the three-phase coils 12*a*, 12*b*, and 12*c* becomes 0 (or close to 0), and is control such that the current value drops to 0 A or close to 0 A after certain excitation is ended. In the intermittent current control, an intermittent current, for example, as shown by a waveform $I_D$ in above-described FIG. 13 and later-described FIG. 15 is caused to flow through each of the coils 12*a*, 12*b*, and 12*c*.

The continuous current control is a current control method (excitation method) in which there is no period where a current that flows through each of the three-phase coils 12*a*, 12*b*, and 12*c* becomes 0 (or close to 0), and is control such that, after certain excitation is ended, the next excitation is started without dropping of the current value to 0 A or close to 0 A. In the continuous current control, a continuous current, for example, as shown by a waveform $I_C$ in later-described FIG. 15 is caused to flow through each of the coils 12*a*, 12*b*, and 12*c*.

During the continuous current control, the current is always flowing through each of the coils 12*a*, 12*b*, and 12*c* such that the current never becomes 0 (or close to 0). Therefore, if the magnetic pole is switched during such continuous current control, there is a possibility that the durability of the inverter 2 is lowered due to the occurrence of sparks in the magnetic pole switching phase (coil 12*b*) or the heat generation of the inverter 2. Accordingly, in this embodiment, when switching of the magnetic pole is expected to be performed by the switching circuit Sw after switching from the intermittent current control to the continuous current control, i.e. in the case where switching of the magnetic pole is to be performed during the continuous current control, switching from the intermittent current control to the continuous current control is once prohibited and then is performed after the magnetic pole is switched by the switching circuit Sw.

Hereinbelow, a specific driving control method by the electronic control unit 100 will be described with reference to FIG. 14. Since the processing contents of steps S1 to S6 in FIG. 14 are the same as those in the first embodiment (see FIG. 7), a description thereof will be omitted.

When the electronic control unit 100 has determined at step S6 that the switching of the magnetic pole is necessary (Yes at step S6), the electronic control unit 100 determines whether or not the current magnetic poles are the NNNSSS winding (step S17). Note that "the current magnetic poles are the NNNSSS winding" represents the case where the motor rotational speed and the motor torque command value, determined according to the applied voltage, are located on the low load range side as shown in FIGS. 8 and 9. In such a low load range, the intermittent current control is generally performed. Therefore, at this step, substantially, it is determined whether or not the intermittent current control is performed for the SR motor 1.

When the current magnetic poles are the NNNSSS winding (Yes at step S17), the electronic control unit 100 determines whether or not switching from the intermittent current control to the continuous current control is to be performed (step S18). At this step, the electronic control unit 100 determines a possibility of switching to the continuous current control, for example, by referring to a switching map for switching between the intermittent current control and the continuous current control (hereinafter referred to as a "current control switching map"). Like the switching map described above (see FIGS. 8 and 9), this current control switching map is such that a driving range of the SR motor 1 that is determined by the torque and rotational speed of the SR motor 1 is divided into two ranges with a predetermined switching line as a boundary therebetween. These two ranges are a range where the intermittent current control is performed (hereinafter referred to as an "intermittent current control range"), and a range where the continuous current control is performed (hereinafter referred to as a "continuous current control range").

Like the low load range described above (see FIGS. 8 and 9), the intermittent current control range is a range where the torque and rotational speed are relatively low. Like the high load range described above (see FIGS. 8 and 9), the continuous current control range is a range where the torque and rotational speed are relatively high. Like the switching line L described above (see FIGS. 8 and 9), the switching line of the current control switching map is formed by a curved line or a straight line such that the higher the torque, the lower the rotational speed and that the lower the torque, the higher the rotational speed. The switching line of the current control switching map may be located at the same position as the switching line L or may be located on the low load range side or the high load range side compared to the switching line L.

At step S18, when an operating point determined by the motor rotational speed and the motor torque command value is expected to move from the intermittent current control range side to the continuous current control range side across the switching line, the electronic control unit 100 determines that switching from the intermittent current control to the continuous current control is to be performed.

When the electronic control unit 100 has determined that the switching to the continuous current control is to be performed (Yes at step S18), the electronic control unit 100 prohibits the switching to the continuous current control (step S19). That is, the electronic control unit 100 does not perform the switching from the intermittent current control to the continuous current control and maintains the current intermittent current control.

Then, the electronic control unit 100 determines whether or not a current flowing through the coil 12*b* being the magnetic pole switching phase among the three-phase coils 12*a*, 12*b*, and 12*c* is 0 (or close to 0) (step S20). When the electronic control unit 100 has determined that the current flowing in the magnetic pole switching phase (coil 12*b*) is 0 (or close to 0) (Yes at step S20), the electronic control unit 100 switches the magnetic pole (step S21). The processing contents of step S21 are the same as those of step S8 in the first embodiment (see FIG. 7).

Then, the electronic control unit 100 allows the switching to the continuous current control (step S22). That is, the electronic control unit 100 performs the switching from the intermittent current control to the continuous current control and ends this routine.

When the electronic control unit 100 has determined at step S6 that the switching of the magnetic pole is not necessary (No at step S6), the electronic control unit 100 maintains the current magnetic poles (winding pattern) (step S23) and returns to determination at step S6. When the electronic control unit 100 has determined at step S17 that the current magnetic poles are not the NNNSSS winding (No at step S17), or has determined at step S18 that the switching to the continuous current control is not to be performed (No at step S18), the electronic control unit 100 determines whether or not a current flowing in the magnetic pole switching phase (coil 12*b*) among the three-phase coils 12*a*, 12*b*, and 12*c* is 0 (or close to 0) (step S24).

When the electronic control unit 100 has determined that the current flowing in the magnetic pole switching phase (coil 12*b*) is 0 (or close to 0) (Yes at step S24), the electronic control unit 100 switches the magnetic pole (step S25) in the same manner as at step S21 and ends this routine.

When the electronic control unit 100 has determined at step S24 that the current flowing in the magnetic pole switching phase (coil 12*b*) is not 0 (or close to 0) (No at step S24), the electronic control unit 100 maintains the current magnetic poles (step S26) and returns to determination at step S24. When the electronic control unit 100 has determined at step S20 that the current flowing in the magnetic pole switching phase (coil 12*b*) is not 0 (or close to 0) (No at step S20), the electronic control unit 100 maintains the current magnetic poles (step S27) and returns to determination at step S20.

Figure 15:
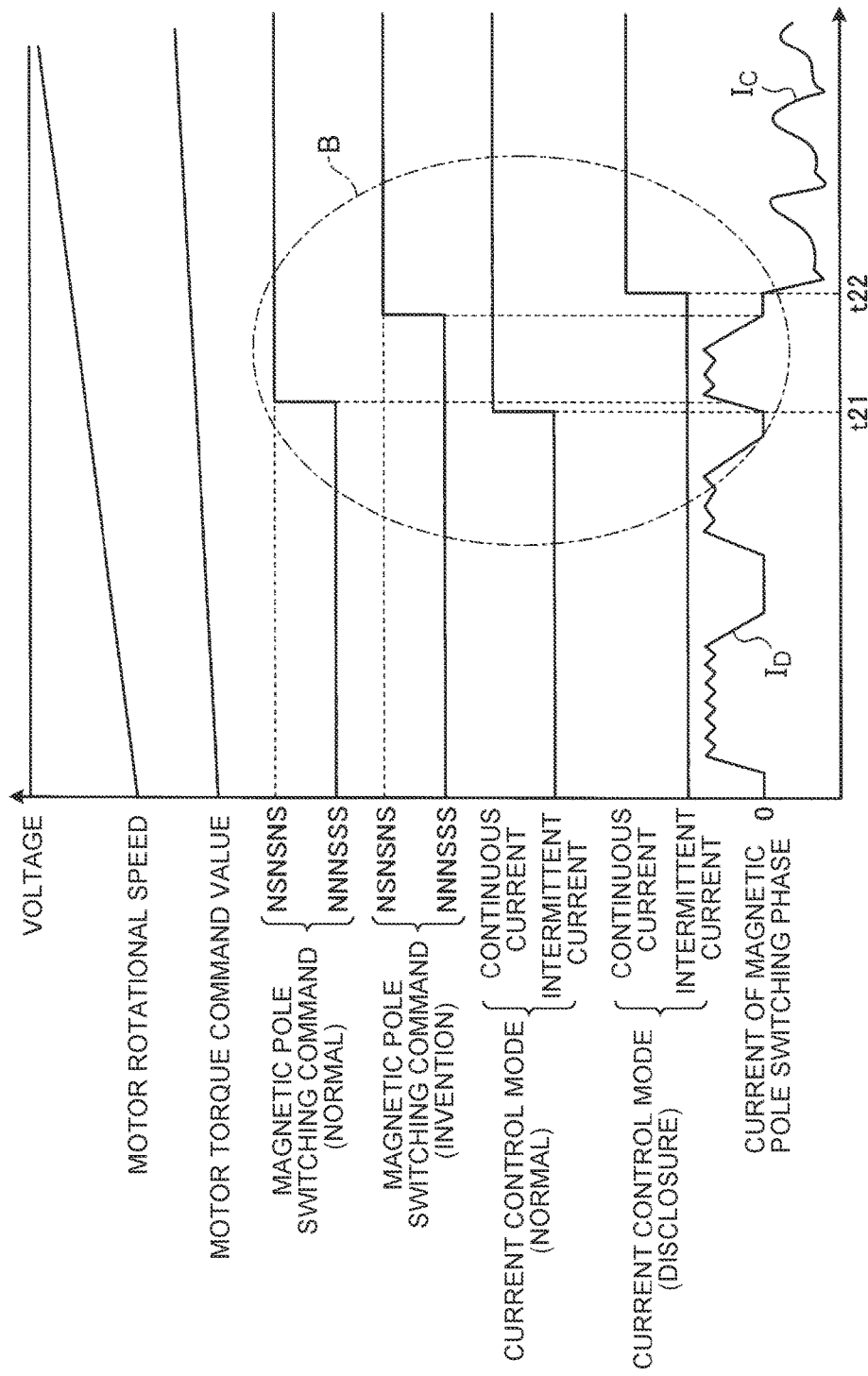
FIG. 15 is a time chart showing a state of the switched reluctance motor when driving control is performed by the second embodiment of the driving control method by the control device for the switched reluctance motor according to the embodiment of the disclosure.

As shown at a portion B in FIG. 15, the control device for the SR motor 1 according to this second embodiment does not perform switching from the intermittent current control to the continuous current control immediately at a time point (=t21) when the current control switching condition is established (see "CURRENT CONTROL MODE (NORMAL)"), but performs switching from the intermittent current control to the continuous current control at a time point (=t22) after the current control switching condition is established and further the magnetic poles are switched from the NNNSSS winding to the NSNSNS winding (see "CURRENT CONTROL MODE (DISCLOSURE)"). That is, the switching from the intermittent current control to the continuous current control is prohibited until the magnetic poles are switched from the NNNSSS winding to the NSNSNS winding.

In this way, when the magnetic pole switching condition is established (see step S6 in FIG. 14) and further the current control switching condition is established (see step S18 in FIG. 14), the control device for the SR motor 1 according to this second embodiment does not switch the magnetic pole during the continuous current control in which there is no period where a current that flows through each of the coils 12 becomes 0, but switches the magnetic pole during the intermittent current control in which there is a period where a current that flows through each of the coils 12 becomes 0. Therefore, since the switching of the magnetic pole is not performed in a current flowing state, it is possible to further suppress the occurrence of sparks and the heat generation of the inverter 2 upon switching the magnetic pole. Further, it is possible to suppress torque fluctuation, vibration degradation, and degradation in efficiency which are otherwise caused by a rapid change in current flowing in the SR motor 1 upon switching the magnetic pole.

Hereinbelow, a vehicle to which the control device for the SR motor 1 according to this embodiment is applied will be described with reference to FIG. 16. A vehicle 200 shown in FIG. 15 includes an engine 201, wheels 202, a transmission (T/M) 203, a differential gear 204, drive shafts 205, and SR motors (SRMs) 1. The vehicle 200 is a four-wheel drive vehicle in which the engine 201 drives the left and right front wheels 202FL and 202FR, while the SR motors 1 as rear motors respectively drive the left and right rear wheels 202RL and 202RR.

The SR motor 1 is a so-called in-wheel motor and is provided for each of the left and right rear wheels 202RL and 202RR. In a rear drive unit of the vehicle 200, the left rear SR motor 1RL is connected to the left rear wheel 202RL, and the right rear SR motor 1RR is connected to the right rear wheel 202RR. The left and right rear wheels 202RL and 202RR are rotatable independently of each other.

The left rear wheel 202RL is driven by the output torque (motor torque) of the left rear SR motor 1RL. The right rear wheel 202RR is driven by the output torque (motor torque) of the right rear SR motor 1RR.

The left rear SR motor 1RL and the right rear SR motor 1RR are connected to a battery (B) 4 via an inverter 2. The left rear SR motor 1RL and the right rear SR motor 1RR each function as an electric motor by electric power supplied from the battery 4, and also as an electric generator that converts torque (external force) transmitted from the rear wheel 202RL, 202RR into electric power. The inverter 2 includes an electric circuit for the left rear SR motor 1RL and an electric circuit for the right rear SR motor 1RR.

An electronic control unit 100 controls the left rear SR motor 1RL, the right rear SR motor 1RR, and the engine 201. For example, the electronic control unit 100 includes an SR-motor electronic control unit (ECU) and an engine electronic control unit (ECU). In this case, the engine ECU performs engine torque control to adjust an output torque of the engine 201 to a target torque value by intake control, fuel injection control, ignition control, and so on. The SR-motor ECU performs motor control for the left rear SR motor 1RL and the right rear SR motor 1RR based on resolver signals input from a rotational speed sensor 51. The rotational speed sensor 51 includes a left rear rotational speed sensor 51RL that detects a rotational speed of the left rear SR motor 1RL, and a right rear rotational speed sensor 51RR that detects a rotational speed of the right rear SR motor 1RR.

While the control device for the switched reluctance motor according to the disclosure has been described in detail with reference to the mode for carrying out the disclosure, the spirit of the disclosure is not limited to those descriptions and should be broadly interpreted based on the description in the claims. Further, it goes without saying that various changes, modifications, and so on that are made based on those descriptions are included in the spirit of the disclosure.

For example, in the control device for the SR motor 1 according to this embodiment, a voltage step-down portion (step-down converter) for reducing a voltage that is applied to the SR motor 1 may be provided instead of the voltage booster 3 (see FIG. 1).

Figure 17:
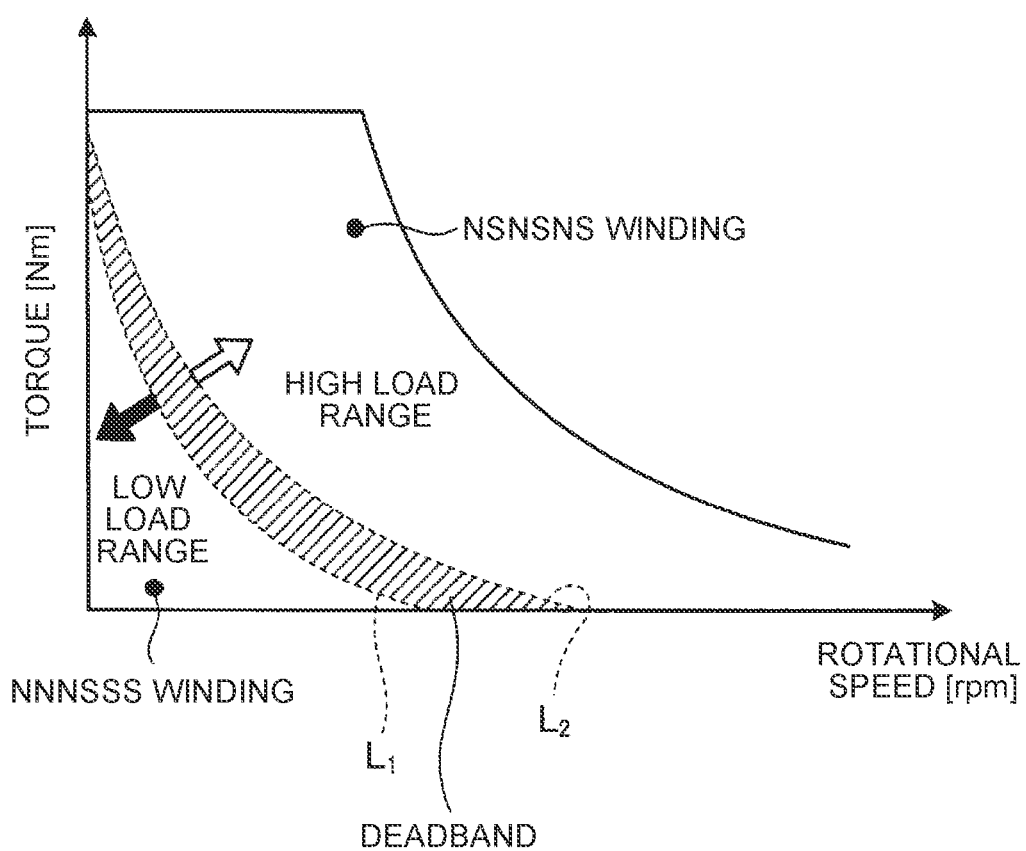
FIG. 17 is a graph showing the characteristics of each winding pattern in the control device for the switched reluctance motor according to the embodiment of the disclosure, wherein a deadband is provided at the boundary between a low load range and a high load range.

In the control device for the SR motor 1 according to this embodiment, when determining whether or not the motor rotational speed and the motor torque command value represent a low load (see step S6 in FIG. 7), use may be made of, for example, as shown in FIG. 17, a switching map in which a deadband where switching of the winding pattern is not performed is provided at the boundary between a low load range and a high load range. In this case, as shown in FIG. 17, at the boundary between the low load range and the high load range, a first switching line $L_1$ is provided on the low load range side, a second switching line $L_2$ is provided on the high load range side, and a deadband is provided between the first switching line $L_1$ and the second switching line $L_2$. When the operating point of the SR motor 1 is located in the deadband, the electronic control unit 100 does not perform switching between the NNNSSS winding and the NSNSNS winding.

In the control device for the SR motor 1 according to this embodiment, by providing the deadband, switching loss due to frequent switching of the winding pattern can be suppressed, for example.

In the control device for the SR motor 1 according to this embodiment, as shown in FIG. 3, if the inverter 2 includes a switching circuit Sw for at least one phase, switching between the NNNSSS winding and the NSNSNS winding is made possible, but the inverter 2 may include switching circuits Sw for a plurality of phases. In this case, in FIG. 3, transistors which are the same as the transistors Trb3 and Trb4 of phase B may be respectively added to the diodes Da3 and Da4 of phase A and the diodes Dc3 and Dc4 of phase C, each encircled by a broken line.

Consequently, in the control device for the SR motor 1 according to this embodiment, since the plurality of switching circuits Sw take charge of switching operations, the load of the inverter 2 due to frequent switching of the winding pattern can be distributed, for example.

Figure 16:
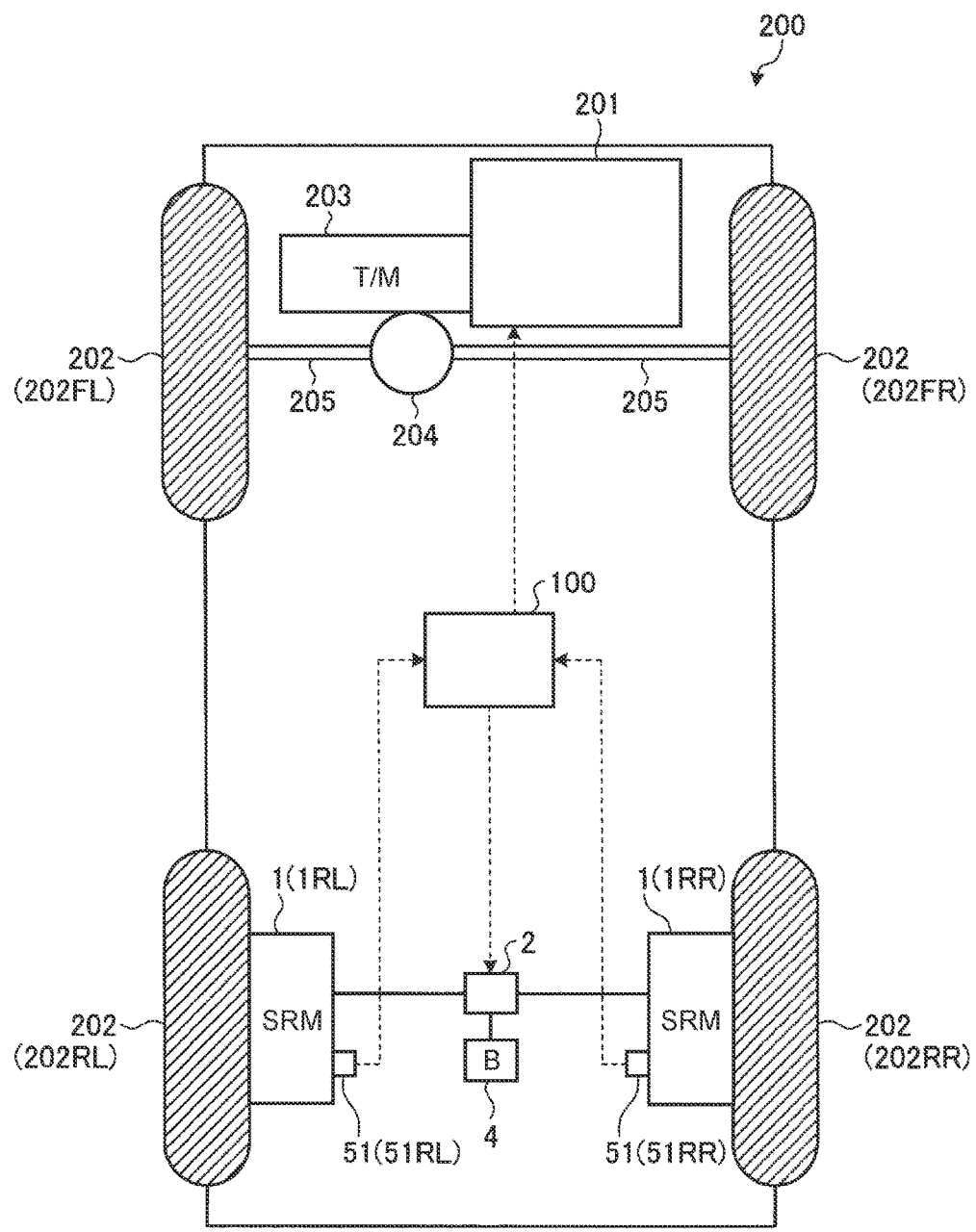
FIG. 16 is a skeleton diagram showing a vehicle to which the control device for the switched reluctance motor according to the embodiment of the disclosure is applied.

An application example of the control device for the SR motor 1 according to this embodiment is not limited to "Application Example 1" shown in FIG. 16. For example, an application example of the control device for the SR motor 1 may be "Application Example 2" of a configuration in which, differently from "Application Example 1", the SR motors 1 are provided for all the wheels 202. Alternatively, differently from "Application Example 1", it may be "Application Example 3" which is a rear-wheel drive vehicle provided with no front drive unit.

An application example of the control device for the SR motor 1 may be "Application Example 4" of a configuration in which, differently from Application Examples 1 to 3, a travel power source of the vehicle 200 is only the SR motor 1 as an in-wheel motor. Alternatively, differently from "Application Example 4", it may be "Application Example 5" of a configuration in which the SR motor 1 is not an in-wheel motor.

An application example of the control device for the SR motor 1 may be "Application Example 6" in which, differently from "Application Example 5", the configuration of "Application Example 1" is mounted as a front drive unit. Alternatively, it may be "Application Example 7" of a configuration in which, differently from "Application Example 3", no rear drive unit is provided, or in which, differently from "Application Example 4", the arrangement of a drive unit is longitudinally reversed.

What is claimed is:

1. A control device for a switched reluctance motor, the switched reluctance motor being configured to be driven when excitation currents flow through three-phase coils of the switched reluctance motor, the control device comprising:

an inverter including a switching circuit configured to switch a magnetic pole to provide a first winding pattern or a second winding pattern by changing a direction of current that flows in at least one phase of the three-phase coils, the first winding pattern being a winding pattern in which the three-phase coils are wound in the same direction, the second winding pattern being a winding pattern in which the two coils of the three-phase coils are wound in the same direction, the remaining one coil is wound in an opposite direction, and the two coils with the same winding direction and the one coil with the opposite winding direction are alternately arranged; and an electronic control unit configured to:

with respect to a boundary dividing a driving range of the switched reluctance motor into a first range and a second range, the driving range determined by a torque and a rotational speed of the switched reluctance motor, (i) switch the magnetic pole by the switching circuit so as to provide the first winding pattern when the torque and the rotational speed that are determined according to an applied voltage are located in the first range on a low load side;

(ii) switch the magnetic pole by the switching circuit so as to provide the second winding pattern when the torque and the rotational speed that are determined according to the applied voltage are located in the second range different from the first range;

(iii) allow switching of the magnetic pole in a case where a current of the phase whose magnetic pole is to be switched among the three-phase coils is 0 when switching the magnetic pole by the switching circuit; and (iv) prohibit switching of the magnetic pole in a case where the current of the phase whose magnetic pole is to be switched is not 0.

2. The control device according to claim 1, wherein the electronic control unit is configured to:

(i) switch between intermittent current control in which there is a period where a current that flows through each of the three-phase coils becomes 0, and continuous current control in which there is no period where a current that flows through each of the three-phase coils becomes 0, according to the torque and the rotational speed of the switched reluctance motor; and (ii) perform the switching from the intermittent current control to the continuous current control after the magnetic pole is switched by the switching circuit, when the electronic control unit switches the magnetic pole by the switching circuit after switching from the intermittent current control to the continuous current control.

3. The control device according to claim 1, wherein
the second range when the voltage applied to the switched reluctance motor is low is wider than the second range when the voltage applied to the switched reluctance motor is high.

4. The control device according to claim 1, wherein
a deadband in which switching between the first winding pattern and the second winding pattern is not performed is provided at the boundary between the first range and the second range.

5. The control device according to claim 1, wherein
the inverter includes switching circuits for a plurality of phases.

* * * * *